(12) United States Patent
Rehtijärvi

(10) Patent No.: US 9,558,512 B2
(45) Date of Patent: Jan. 31, 2017

(54) PROVIDING A CUSTOMIZED APPLICATION TO A USER TERMINAL

(75) Inventor: Pekka Rehtijärvi, Helsinki (FI)

(73) Assignee: INTELLIPOCKET OY, Helsinki (FI)

( * ) Notice: Subject to any disclaimer, the term of this patent is extended or adjusted under 35 U.S.C. 154(b) by 752 days.

(21) Appl. No.: 13/994,583

(22) PCT Filed: Dec. 16, 2011

(86) PCT No.: PCT/FI2011/051122
§ 371 (c)(1),
(2), (4) Date: Jun. 14, 2013

(87) PCT Pub. No.: WO2012/080578
PCT Pub. Date: Jun. 21, 2012

(65) Prior Publication Data
US 2013/0268390 A1    Oct. 10, 2013

(30) Foreign Application Priority Data
Dec. 17, 2010    (FI) ..................................... 20106336

(51) Int. Cl.
*G06F 19/00*    (2011.01)
*G06Q 30/06*    (2012.01)
(Continued)

(52) U.S. Cl.
CPC ......... *G06Q 30/0621* (2013.01); *G06F 9/4448* (2013.01); *H04L 63/102* (2013.01);
(Continued)

(58) Field of Classification Search
CPC . G06Q 30/0621; G06F 9/4448; H04L 67/306; H04L 67/303; H04L 63/102; H04L 67/02; H04L 67/34; H04W 4/18
See application file for complete search history.

(56) References Cited

U.S. PATENT DOCUMENTS 8,959,426 B1 *  2/2015  Thakare ................. H04L 67/34
                                               715/234
2002/0174196 A1  11/2002  Donohoe et al.
(Continued)

FOREIGN PATENT DOCUMENTS

EP    1 182 589 A2    2/2002
EP    1343106 A2      9/2003
(Continued)

OTHER PUBLICATIONS

Mobiilikortti FAQ; retrieved from http://cdn.mobiilikortti.com/docs/FAQ.pdf; publication date not found.
(Continued)

*Primary Examiner* — Mary Cheung
(74) *Attorney, Agent, or Firm* — Barnes & Thornburg LLP

(57) ABSTRACT

Techniques for providing a user terminal with a web application, which is customized in respect of terminal-specific properties and, optionally, user-specific parameters. An application server stores a template for the customized web application and a feature set for each of several terminal types; receives a request for creation of the customized web application, and determines the user-specific parameters based on the request; sends the user terminal a data message which triggers a request from the user terminal; determines the user terminal's type based on the request; determines the terminal-specific properties based on the determined type; creates the customized web application based on the template, the user-specific parameters and the terminal-specific properties; inserts the customized web application into a set of delivery files for a data communication system and transmits the set of delivery files to the user terminal.

24 Claims, 6 Drawing Sheets

(51) Int. Cl.
*H04L 29/06* (2006.01)
*H04W 4/18* (2009.01)
*G06F 9/44* (2006.01)
*H04L 29/08* (2006.01)

(52) U.S. Cl.
CPC .......... *H04L 67/303* (2013.01); *H04L 67/306* (2013.01); *H04W 4/18* (2013.01); *H04L 67/02* (2013.01); *H04L 67/34* (2013.01)

(56) References Cited

U.S. PATENT DOCUMENTS

| | | |
|---|---|---|
| 2003/0023755 A1 | 1/2003 | Harris et al. |
| 2004/0268228 A1* | 12/2004 | Croney ............... G06F 17/3089 715/255 |
| 2005/0125771 A1* | 6/2005 | Vitanov .................... G06F 8/35 717/104 |
| 2006/0294199 A1* | 12/2006 | Bertholf ............ G06F 17/30893 709/217 |
| 2007/0061486 A1 | 3/2007 | Trinh et al. |
| 2007/0157096 A1* | 7/2007 | Keren ....................... G06F 8/34 715/760 |
| 2007/0282879 A1* | 12/2007 | Degenkolb ....... G06F 17/30864 |
| 2009/0008445 A1 | 1/2009 | Chen et al. |
| 2009/0012900 A1 | 1/2009 | Morin et al. |
| 2009/0119678 A1 | 5/2009 | Shih et al. |
| 2009/0156180 A1 | 6/2009 | Slavin et al. |
| 2010/0070566 A1 | 3/2010 | Vandewalle |
| 2010/0325202 A1 | 12/2010 | Rehtijärvi |
| 2011/0300834 A1 | 12/2011 | Ni |
| 2012/0131062 A1* | 5/2012 | Kaisermayr ........... G06Q 10/10 707/803 |

FOREIGN PATENT DOCUMENTS

| | | |
|---|---|---|
| FI | 20095696 A | 12/2010 |
| KR | 20040042522 | 5/2004 |
| WO | 2005/026981 A1 | 3/2005 |
| WO | 2008067675 A1 | 6/2008 |
| WO | 2010/004549 A2 | 1/2010 |
| WO | 2010063200 A1 | 6/2010 |
| WO | 2010146241 A1 | 12/2010 |

OTHER PUBLICATIONS

Mobiilikortti pikaopas; retrieved from http://cdn.mobillikortti.com/docs/www-pikaopas.pdf; publication date not found.
Search Report for Finnish Patent Application No. 20106336; Aug. 16, 2011.
Search Report for International Patent Application No. PCT/FI2011/051122; May 15, 2012.
International Preliminary Report on Patentability for International Patent Application No. PCT/FI2011/051122; Mar. 19, 2013.
European Search Report for Application No. 11849211.5 dated Jan. 3, 2014.

* cited by examiner

Fig. 5

```
501 →    <card>
502 →      <background tile='tile.png' style='fill'/>
503 →      <image id='logo' src='/image.png' align='center'y='1'/>
504 →      <string id='name' text='Test User' align='center' y='10'/>
505 →      <string id='id' text='123456' align='center' y='20'/>
510 →      <menu height='10' width='20'>
511 →        <item id='weblaunch' text='Web access' url='anyurl?flash=no'/
512 →        <item id='web2' text='Where am I' url='anyurl?lapi=LongLat' />
             <item id='weblaunch3' text='Dynamic web' url='anyurl?ajax=yes' />
             <item id='exit' text='Exit' value='quit'/>
517 →        <itemid='send-to-friend' text='Send to Friend' value='send.zml'/>
518 →        <item id='subpage' text='Show barcode' value='/barcode.zapml'/>
519 →      </menu>
520 →      <nfc-id tag='123456'/>
           <flash ='no'/>
522 →      <javascript='yes' enable='yes'/>
523 →      <location-api='yes' enable='yes' />
           <send-to-friend='yes' />
           <card-expire='12092009 133058'/>
           <3gpp-play='yes'/>
           <j2me-video='yes' audio='yes' http='yes' socket='yes'/>
           <capability name="loctapi" value="true"/>
           <capability name="3dapi" value="true"/>
530 →      <capability name="Bluetooth" value="true"/>
531 →      <capability name="lock_imei" value="true"/>
539 →    </card>
```

500

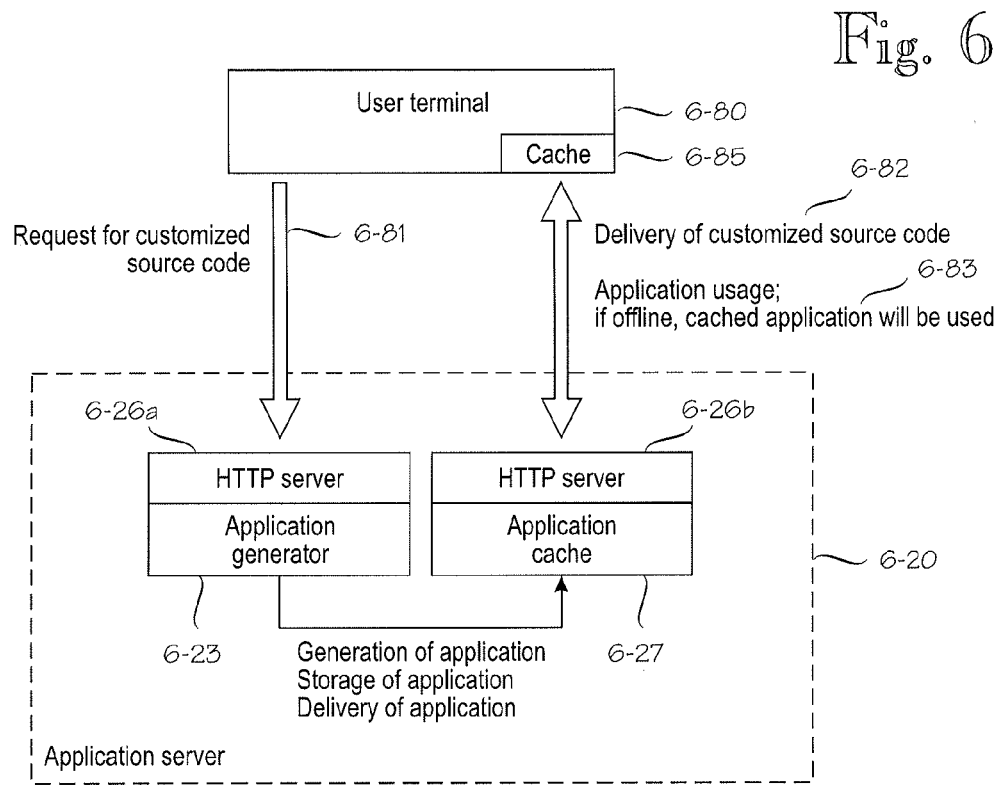
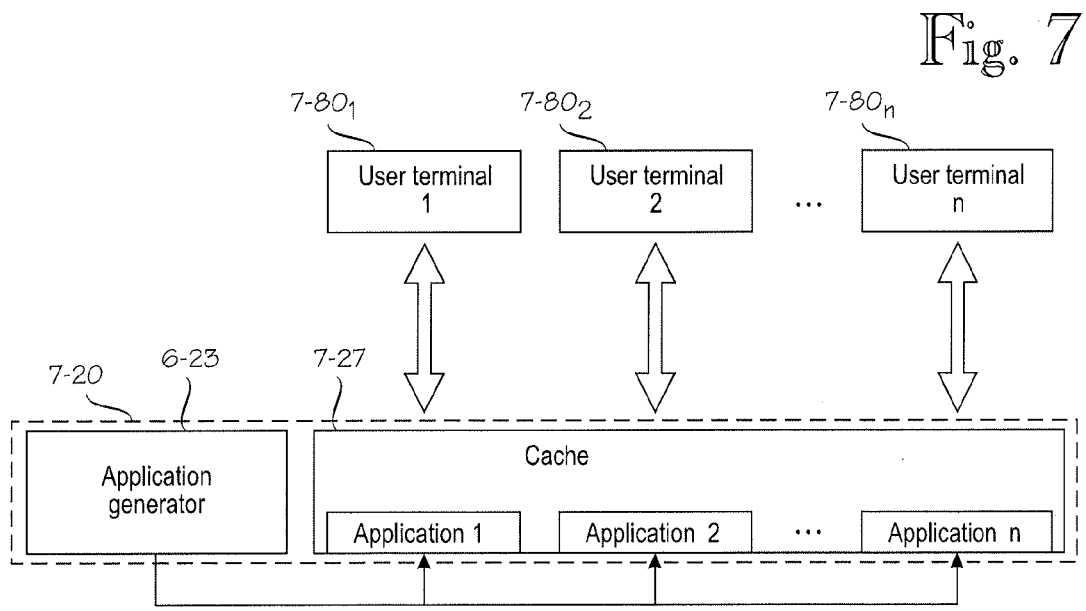

PROVIDING A CUSTOMIZED APPLICATION TO A USER TERMINAL

PRIORITY CLAIM

The present application is a U.S. national stage of PCT/FI2011/051122, filed 16 Dec. 2011, which claims priority to Finnish Patent Application No. 20106336, filed 17 Dec. 2010, the disclosure of which are incorporated herein by reference in their entirety.

FIELD

Disclosed embodiments relate to methods, apparatuses and software products for providing customized applications that are to be downloaded to user terminal, such as mobile communication terminals.

An electronic customer loyalty card with embedded functionality serves as an illustrative but non-restrictive example of a customized downloadable application.

A smart mobile phone constitutes a prime example of such terminals, but the ability to initiate or receive calls is not absolutely necessary. In addition to smart mobile phones, an illustrative but non-exhaustive list of terminals that may be adapted to employ the inventive technique includes digital communication terminals, digital cameras, satellite navigation devices, or the like.

BACKGROUND

Customer loyalty cards are traditionally embodied as plastic cards with magnetic stripes that are readable by a magnetic card reader operatively coupled to a checkout terminal, such as a cash register. Such plastic loyalty cards involve certain problems. For example, administration and mailing of the cards is a labour-intensive operation for the issuing companies. Furthermore, the necessity of carrying around a number of physical cards is a burden on the consumers. US patent application 2009/0012900, titled "Making Secure Data for Customer Loyalty Programs" addresses various techniques for implementing electronic loyalty cards.

Replacement of the traditional loyalty cards by their electronic equivalents poses new security threats, particularly if the benefits provided by the various loyalty cards are supposed to be variable, which means that some loyalty cards provide benefits not provided by others. Obviously, the loyalty cards should be tamper-proof, which goal is typically reached by means of cryptographic techniques. But the use of cryptographic techniques and a feature set which depends the customer and the technical parameters of the customer's terminal involves problems that are not adequately addressed in the prior art.

SUMMARY

Disclosed embodiments provide customized applications that are to be downloaded to user terminal in a cost-effective manner which does not compromise data security. The customized applications reflect user-specific parameters as well as terminal-specific properties. Disclosed embodiments provide methods, apparatuses and software products as defined in the attached independent claims. The dependent claims and the following detailed description, along with the attached drawings, describe embodiments which solve residual problems and/or provide additional features.

Also disclosed is a method for providing a user terminal with a customized web application, wherein execution of the web application requires a respective copy of the web application at the user terminal and a server, and wherein the web application is customized in respect of user-specific parameters and terminal-specific properties.

The method comprises the following acts by an application server. The acts are labelled a through g solely for the purpose of facilitate discussion. Such labelling does not imply that the acts must be performed in the following order:

a) storing a template for the customized web application and a feature set for each of several terminal types;
b) receiving a set of requests for creation of the customized web application;
c) determining the user-specific parameters and a type of the user terminal based on the set of requests for the customized web application;
d) determining the terminal-specific properties based on the determined type of the user terminal;
e) creating the customized web application based on the template, the user-specific parameters and the terminal-specific properties;
f) inserting the customized web application into a set of delivery files for a data communication system and transmitting the set of delivery files to the user terminal; and
g) caching the customized web application and/or parameters for re-creating the customized web application at least for a specified validity period of the customized web application.

In a) the application server stores a template for the customized application and a feature set for each of several terminal types. By virtue of the template and the numerous feature sets the application server is able to provide application specifically customized to several different types of user terminals. In b) the application server receives one or more requests for creation of the customized web application. In some implementations all information necessary for creation of the customized web application is transmitted in a single request. In other implementations such information may be transmitted over multiple requests.

In c) the application server determines the user-specific parameters and a type of the user terminal based on the set of requests for the customized web application. In d) the application server determines the terminal-specific properties based on the determined type of the user terminal. For instance, the application server may perform an inquiry to an equipment database, wherein the type of the user terminal is sent as a parameter of the inquiry. The application server then receives the terminal-specific properties from the equipment database as a response to the inquiry.

In e) the application server creates the customized web application based on the template, the user-specific parameters and the terminal-specific properties. What this means is that the web application is both user-specific and terminal-specific (actually, specific to each of several terminal types). In f) the application server inserts the customized web application into a set of delivery files for a data communication system and transmits the set of delivery files to the user terminal. At this point the user terminal downloads the web application that is customized for the type of the terminal as well as its user (subscriber).

Finally, the application server caches the customized web application and/or parameters for re-creating it at least for a specified validity period of the customized web application. By virtue of such caching, the application server can participate in execution of the web application, whose execution requires a similar copy at either end of the client-server architecture.

It should be understood that the application server that creates the customized web application, the application server that downloads it to the user terminal and the application server that participates in its execution can be the same server or a number of different servers.

Another disclosed embodiment is an access server configured to execute the acts of the inventive method which are performed by the application server.

Commonly-owned patent applications, which are identified as reference documents [1] through [3] at the end of this patent specification, disclose specific solutions to the above problems. These reference documents were not public at the priority date of the present application, which is why their entire disclosure is repeated and identified as necessary, and modifications provided by the present disclosures are presented as needed.

The commonly-owned reference documents [1] through [3] disclose a method for providing a user terminal with a customized application, wherein the application is customized in respect of user-specific parameters and terminal-specific properties, the method comprising performing the following acts by an application server:
  storing a template for the customized application and a feature set for each of several terminal types;
  receiving a request for creation of the customized application, and based on the request the application server determines the user-specific parameters;
  sending the user terminal a first data message which triggers a request from the user terminal;
  determining a type of the user terminal based on the request from the user terminal;
  determining the terminal-specific properties based on the determined type of the user terminal;
  creating the customized application based on the template, the user-specific parameters and the terminal-specific properties; and
  inserting the customized application into a set of delivery files for a data communication system and transmitting the set of delivery files to the user terminal.

A residual problem in the technique disclosed in reference documents [1] through [3] is that provisioning of stand-alone (self-sufficient) applications to some terminal platforms is very difficult. Some terminals are designed to execute only applications certified by the terminal manufacturer. Such restrictions are appropriate for mass-marketed applications but prohibitive to customized applications, of which each version is unique. Thus disclosed embodiments overcome this residual problem, in addition to the problems identified earlier. In summary, disclosed embodiments provide customized functionality comparable to that provided by customized applications, at a secure and cost-effective manner, which is compatible with terminals that impose certification requirements to applications.

The residual problem, which relates to the certification requirements imposed by certain terminals or, actually, terminal manufacturers, is overcome by providing the customized functionality in the form of web applications. As used herein, a web application means a set of information material from which web pages may be constructed. An illustrative but non-restrictive list of such information material includes images, text, code segments in markup languages such as HTML and XHTML, stylesheets such as CSS, script languages such as JavaScript, video and audio, as well as various browser plug-in content such as Flash, Silverlight and Java Applet content.

Unlike a stand-alone application, a web application typically does not require certification by terminal manufacturers. Therefore the feature of providing the customized functionality in the form of web applications overcomes the certification-related residual problem. At the same time, the use of web applications for providing the customized functionality causes a different residual problem, which is related to the fact that web applications are not self-sufficient applications. Instead a copy of the web application is needed at either end of the client (terminal)—server pair. This means that the technique disclosed in the commonly-owned reference documents [1] through [3] is insufficient without additional considerations. In one implementation, the server for the web application stores (caches) a copy of each customized web application that the server may need to serve. Such caching of the copy of specific customized web applications shall be continued for the predefined lifetime of that customized web application, for each of the customized applications that an application server may have to support during execution. In an alternative implementation, the server for the web application stores (caches) parameters for creating or re-creating the customized web application on the fly, and re-creates the customized web application in response to a detected contact from the terminal. Alternatively or additionally, the customized web application may be cached by the user terminal.

Much of the following detailed description is identical with portions of the reference documents [1] through [3]. Unless stated otherwise, an application can refer to a web application or stand-alone (self-sufficient) application alike.

At least one disclosed embodiment comprises performing header manipulation on the set of delivery files. The header manipulation operation simplifies delivery of the customized application because the terminal user need not initialize any application-downloading operations. Rather the application server is able to provide the customized application as a response to the request from the user terminal.

The determination of the terminal-specific properties based on the determined type of the user terminal may comprise an inquiry to an equipment database, which receives an identifier of a terminal type as an input and provides the properties of that terminal type as a response.

In at least one disclosed embodiment, the creation of the customized application based on the terminal-specific properties may comprise formatting image information based on the user terminal's screen properties. For example, a two-dimensional barcode may be optimally centered and scaled for the display properties of the terminal type, and an appropriately-dimensioned white margin may be provided around the 2D barcode in order to facilitate scanning of the barcode.

In another disclosed embodiment the template for the customized application comprises information common to several human languages, and the creation of the customized application may also comprise determination of the human language selected for the terminal user. Based on the determined human language, the application server may retrieve human-language-dependent text elements from a language database.

In yet another disclosed embodiment the customized application comprises a concatenation of a network address and identifying information, wherein the network address specifies an address which the user terminal is supposed to contact upon activation of the customized application, and the identifying information identifies the user terminal, its user and/or the customized application. A benefit of this feature is that the terminal user neither has to navigate to the server associated with the application, nor does the user have to identify him/herself with that server. In order to protect user privacy, the customized application may comprise the concatenation in an encrypted form.

Also disclosed is a computer system for providing a user terminal with a customized application. The computer system comprises means for performing the steps of inventive method.

Also disclosed is a software product, executable in a computer system, wherein execution of the software product in the computer system causes the computer system to carry out the inventive method.

BRIEF DESCRIPTION OF THE DRAWINGS

Disclosed embodiments will be described in greater detail by means of specific embodiments with reference to the attached drawings, in which:

FIG. 5 shows a definition file for a customized electronic loyalty card;

FIGS. 6 and 7 illustrate embodiments relating to delivery and execution of customized web applications.

DETAILED DESCRIPTION OF DISCLOSED EMBODIMENTS

Figure 1:
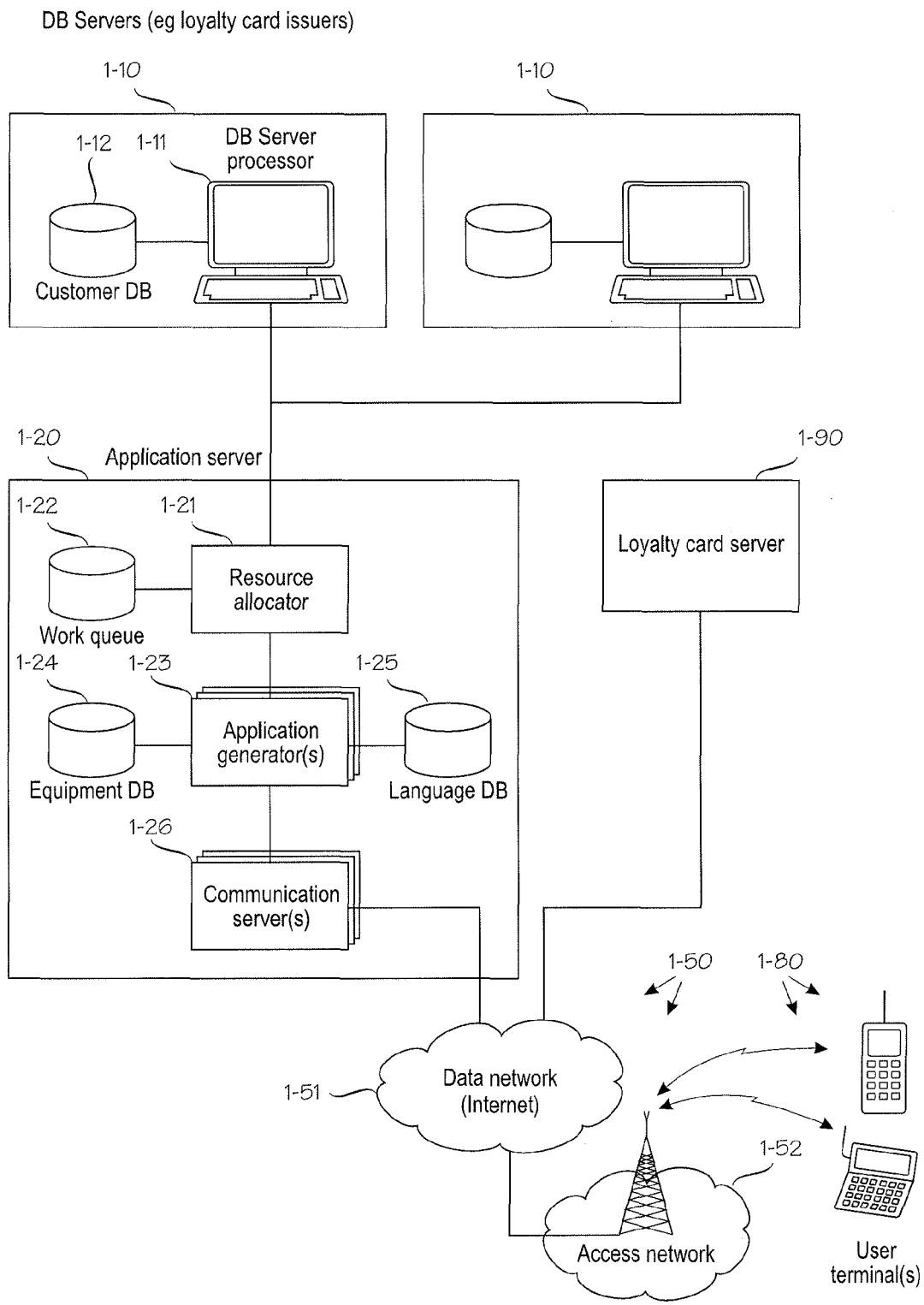
FIG. 1 shows an exemplary system architecture in which the disclosed embodiments can be used.

FIG. 1 shows an exemplary system architecture in which the disclosed embodiments can be used. The four major subsections of FIG. 1 are a set of database servers 1-10, an application server according to at least one disclosed embodiment, generally denoted by reference numeral 1-20, a telecommunication network (signalling system) 1-50 and a number of user terminals, generally denoted by reference numeral 1-80. As shown in FIG. 1, the user terminals 1-80 differ from one another in respect of various properties, including the resolution of their displays.

In the exemplary implementation shown in FIG. 1, each database server 1-10 comprises a database server processor 1-11 and a database 1-12, such as a customer database that stores data relating to customer-specific loyalty cards. As regards hardware, the database servers may represent conventional technology. For the purposes of the disclosed embodiments, it suffices that the database servers 1-10 are capable of requesting the customized application, such as a loyalty card, from the application server 1-20. The customer-specific parameters required for the delivery of the loyalty card can be provided in the request message sent to the application server 1-20. Alternatively, the database server 1-10 should be capable of providing such customer-specific parameters in a response to a separate customer parameter inquiry from the application server 1-20.

As shown in the exemplary implementation shown in FIG. 1, the application server 1-20 comprises a resource allocator 1-21 and a work queue 1-22 for distributing processing resources among several application requests from the one or more database servers 1-10. The processing resources are represented by application generators 1-23, which may be implemented as appropriately programmed data processors. The required programming will be apparent in connection with the following description of the disclosed embodiments. For adapting the requested applications, such as loyalty cards, to the properties of the various user terminals 1-80, the application server 1-20 comprises an equipment database 1-24. Alternatively or additionally, the application server 1-20 may be operatively coupled to an external equipment database (not shown separately). By consulting an optional language database 1-25, the application server may be able to prepare customized applications in several human languages. One or more communication servers 1-26 serve to distribute the generated applications among the user terminals 1-80 via the telecommunication networks 1-50.

In a typical network architecture, the telecommunication networks 1-50 comprise a data network 1-51, which typically is the internet, and an access network 1-52, which typically is a cellular mobile network, a wired or wireless local-area network, or the like. Details of the telecommunication networks 1-51, 1-52, such as intervening network elements, are omitted for the sake of clarity, as such elements represent conventional technology. Alternatively or additionally, a user terminal 1-80 may be coupled to a personal computer (not shown) via a short-range connection, such as an infrared or Bluetooth connection, wherein the personal computer is connected to the application server 1-20 via the internet 1-51. Finally, reference numeral 1-90 denotes a representative server to be contacted on activation of the customized application in the user terminal. In the exemplary case of the loyalty card, the server 1-90 is the server via which the terminal users may obtain status information concerning their loyalty card accounts.

As regards system architecture, FIG. 1 shows a rather complex, scalable implementation which is capable of supporting a large number of user terminals and issuers of loyalty cards (or other kinds of database servers). For less demanding environments, the disclosed embodiments can be implemented in a less ambitious manner. For example, there may be only one application generator 1-23 and only one communication server 1-25, and in environments which do not require multiple instances of these elements, the resource allocator 1-21 may be omitted as well. In yet another implementation, the application server 1-20 may be installed at the sites of the database servers 1-10.

As regards hardware, the application server may be implemented by means of conventional server technology. The novel elements of the disclosed embodiments may be embodied in appropriate programming of computerized data processing systems and databases. Specifically, the one or more application generators perform the customization and creation of the application, after which the application is conveyed to a communication server for delivery to the user terminal. The servers are data processors with associated memory and peripheral hardware. Thus the disclosed embodiments can be embodied as a software product which is storable in the memory of the application server, such that execution of the inventive software product in the application server causes it to carry out the inventive method.

Figure 2:
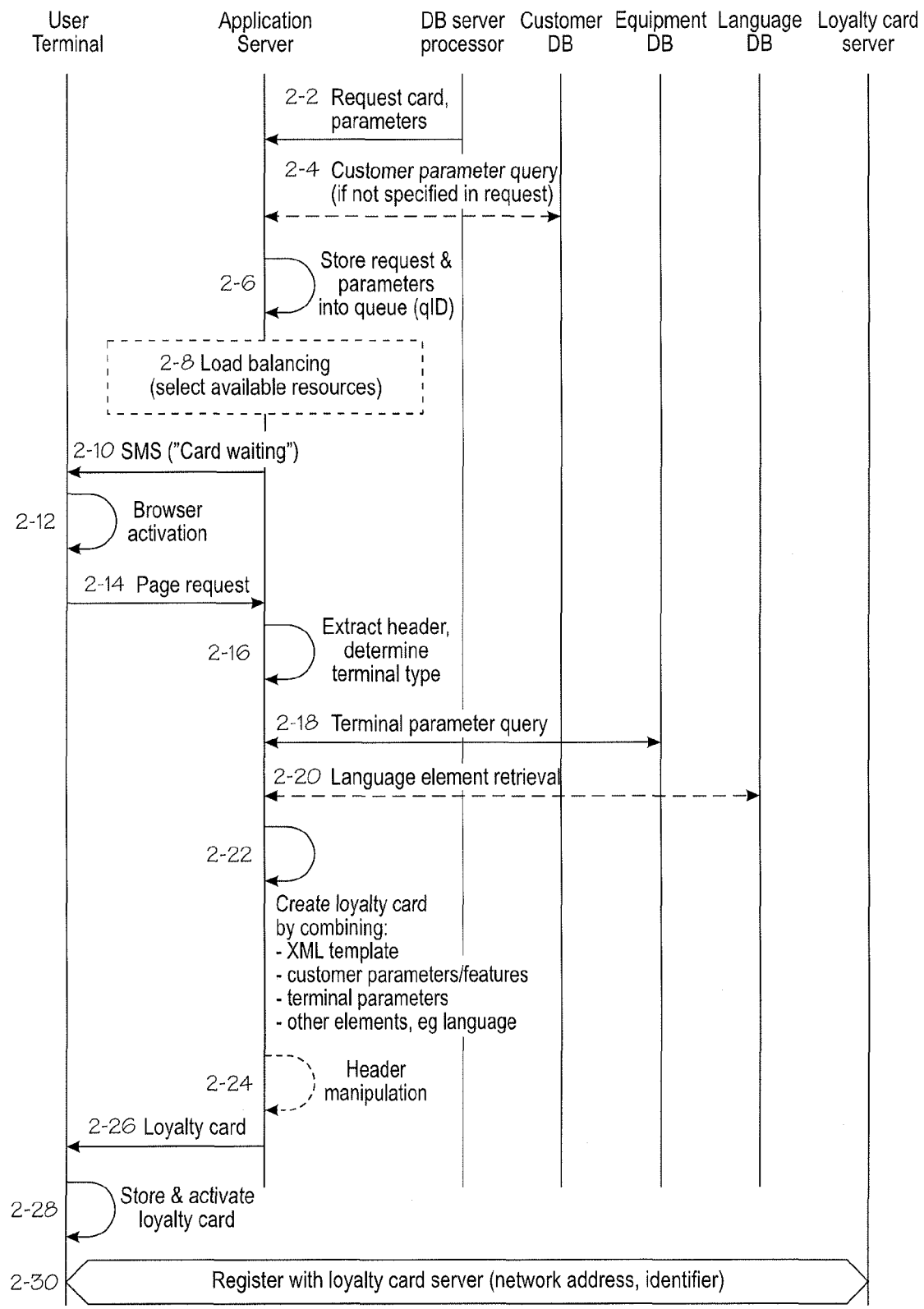
FIG. 2 is a signalling diagram which shows an exemplary use case in connection with dispatching of electronic loyalty cards.

FIG. 2 is a signalling diagram which shows an exemplary use case of the disclosed embodiments in connection with dispatching of electronic loyalty cards. In FIG. 2, time advances from top to bottom, and dashed lines indicate optional acts, ie, acts which are not strictly essential but solve specific residual problems and/or provide additional benefits. In step 2-2, the database server (item 1-10 in FIG. 1) sends the application server a request for a customized application, such as a loyalty card. The request should include the necessary customer-specific parameters, such as the name and identifier (id) of the customer, the name and id of the issuer of the loyalty card, the loyalty card's name and type, in cases wherein there are several versions, such as a "gold" card, a "silver" card, or the like. Understanding the disclosed embodiments does not necessitate enumeration of all the possible customer-specific and/or issuer-specific parameters. Rather it suffices to say that each loyalty card is individually prepared for a specific customer. It should be noted that each loyalty card will also be individually prepared for the customer's specific terminal, but the database server 1-10 does not keep track of terminal-specific property information. Rather the terminal-specific property information will be determined and used for the customization of the loyalty card later, in connection with steps 2-10 through 2-26.

Normally the database server processor includes all the customer-specific parameters in the request 2-2 for the customized loyalty card. On the other hand, if the card request message 2-2 does not provide all the necessary information for the preparation of the card, the application server may send a separate inquiry 2-4 to the card issuer's customer database. In step 2-6 the application server's resource allocator 1-21 stores the request and the customer-specific parameters into the work queue 1-22 and assigns a queue identifier (qID) to the request. In a multi-processor implementation, the application server may perform an optional step 2-8, which involves load balancing operations, such as selecting and/or waiting for available resources.

At this point the application server has the necessary customer-specific parameters. What it does not have is the customer's terminal-specific property information, such as screen size or resolution and the ability to support various optional features. Interestingly, current Java-enabled mobile terminals do not provide an easy answer to the question of how to request the terminal to indicate its own screen size or resolution to the application server. In a straightforward implementation the customer could log in to some web server and indicate his/her terminal type, whereby such information could be obtained from the customer. In another implementation, a short program routine could be first downloaded, for the purpose of determining and reporting the screen parameters. FIG. 2 shows an embodiment which is capable of determining the terminal type in a more or less automated manner. The automatic determination of the terminal type is initiated in step 2-10, which involves sending a data message, such as a short message, to the user terminal. The short message essentially indicates to the terminal (or its user) that a customized loyalty card is about to be delivered. The short message may indicate a network address of the application server and a temporary identifier of the user terminal. For example, the network address may be of the following form:
http://application-server.mobi/customer/23456

In the above network address, application-server.mobi is the application server's network address, while customer/23456 is the temporary identifier assigned to the user terminal. In response to the short message, which includes the network address of the application server, the user terminal may propose activation of a web browser to this network address, in which case the terminal waits for the user's acceptance before navigating to the network address. Alternatively, the user terminal may be configured to navigate to the network address without requiring the user's acceptance. As a third alternative, the terminal user may pick up the network address from the short message and navigate to that address himself/herself. In any case the user terminal navigates to the application server's network address in step 2-14. Inclusion of the user's or user terminal's temporary identifier in the messages 2-10 and 2-14 helps the application server to identify the user terminal, and the user does not have to perform a separate login procedure.

As is well known, navigation to a network address by a web browser normally involves requesting a web page (hypertext markup language, HTML, page) from the network address. Now, if the application server responded to the user terminal's web page request by directly downloading the customized application (loyalty card), two problems could be seen. A first problem is that the customized application does not reflect the user-terminal's terminal-specific properties. The other problem is that the user terminal's browser would be confused by receiving a program in response to the request for a web page.

The first problem, which relates to the customization of the loyalty card by the terminal-specific properties is solved in the following manner. In step 2-16 the application server extracts the data packet's header from the request for the web page that the user terminal sent in step 2-14. From the packet header the application server determines the type, ie, manufacturer and model, of the user terminal. In step 2-18 the application server sends a terminal parameter inquiry to the equipment database and obtains the terminal parameters in the response to the inquiry. At this point the application server has all the information it needs to customize the loyalty card in respect of both customer-specific parameters and terminal-specific properties.

Next, in step 2-22, the application server creates the customized loyalty card. In a representative implementation, the application server creates the customized loyalty card by starting with a loyalty card template information. The application server then combines the template information with the customer-specific parameters and/or features and the terminal-specific properties. In a representative but non-restrictive implementation the template information is stored as a file in a self-documenting modelling language, such as XML (extendible modelling language). The template information defines the functionality of the customized application. One of the features defined by the template is an associated network address, such as a URL (uniform resource locator) address, which the user terminal is to contact on activation of the customized application. Under the assumption that the customized application is a loyalty card, the network address is typically that of the loyalty card server (item 1-90 in FIG. 1). The network address may be of the following form:
http://loyalty-card-server.mobi As briefly stated in connection with FIG. 1, the application server 1-20 may comprise an optional language database 1-25, by means of which the application server is able to prepare customized applications in multiple human languages. If multiple human languages are to be supported, the request message 2-2 from the database server should include an identifier of the human language selected for the loyalty card (or other type of application). In one implementation, the language database comprises a separate version of the template file for each supported human language. A drawback of this implementation is that the functionality of the customized application, which is stored in the template file(s), must be separately maintained for each template file version. An improved implementation of the multi-language support involves a common template for all supported languages. The common template file may comprise a placeholder, such as a text identifier, for each language-dependent text element. Based on the text identifier and the language identifier, the application generator 1-23 queries the language database 1-25 for the each language-dependent text element. While this step is not shown separately, it is analogous with the query 2-18 to the equipment database.

A combination of the loyalty card template information with the customer-specific parameters and terminal-specific properties results in a loyalty card which is individually customized for the customer and their terminal. The remaining, optional, operations in the card-preparation phase relate to formatting of image information, data security and/or prevention of fraudulent behaviour.

One of such optional operations involves concatenating the network address associated with the customized application with an identifier of the loyalty card, the user terminal or its user. Such a concatenation of a network address and the identifier of the loyalty card may take the following form:
http://loyalty-card-server.mobi/acme_card456789

Herein, acme_card456789 is the identifier of the individual user's loyalty card. In the loyalty card example, the concatenation of the user identifier with the URL of the loyalty card server has the benefit that the terminal user may simply select an activity, such as "my account", from the loyalty card application's menu, and the application directs the user terminal's browser to the loyalty card server associated with that URL. The server may then use the user identifier to determine the identity of the incoming user and provide him/her with proper user-specific account data.

If the loyalty card comprises a concatenation of the user identifier with the URL of the server associated with the loyalty card server, it is also beneficial to encrypt the concatenation, or make a multi-byte checksum, such as a hash code of it, so as to hide the identity of the user and to prevent users from querying account data other than their own.

Another optional operation involves incorporating into the customized application some identifying information as a barcode. The identifying information may identify the user, the user terminal and/or the customized application, such as the loyalty card. For example, the loyalty card's identifier could be embedded into the loyalty card in the form of a two-dimensional barcode, which is readable by optical scanners. While it is self-evident that the two-dimensional barcode reflects the identifier of the loyalty card, it may not be equally self-evident that the bard code should also reflect the properties of the user terminal, most notably its screen size and/or resolution. The barcode should ideally be formatted, that is scaled and positioned, such that the actual barcode is surrounded by a white margin with a width of approximately one centimeter, and the actual barcode optimally fills the space remaining inside the white margin. The white margin helps optical scanners to isolate the barcode from its surroundings. In order to dimension the barcode and the white margin optimally, the application server should determine the user terminal's parameters beforehand, as was explained in connection with steps 2-14 through 2-18. Other images may be formatted in an analogous manner.

At this point all the information for the customized loyalty card has been assembled by the application generator. Next the assembled information is packaged into a set of delivery files, the format of which depends on the type of the user terminal. For example, Java-enabled mobile terminals may be supported by means of .jar and .jad files. The .jar file contains all the functionality of the application, that is, the information from the template file, the optional language-dependent text elements, the user-specific features and the terminal-specific properties. The .jad file, on the other hand, contains a Java Application Descriptor which, for instance, may be displayed via the terminal's display to indicate descriptor information associated with the application, such as author, version, application size, or the like.

At this point the customized loyalty card is ready for delivery to the user terminal. A well-known method of delivering a Java application to a mobile terminal is to send the mobile terminal a message that includes one or more links. By clicking the link, the terminal user can initiate downloading of the customized application. Step 2-24 of FIG. 2 relates to a more elegant delivery technique, in which the customized loyalty card is provided to the user terminal as an automated response to the page request 2-14. A residual problem herein is that the user terminal's browser requested an http page, while the application server is about to deliver a program, namely the customized application. Accordingly, in step 2-24, the application server performs a header manipulation operation, as a result of which the application server will be able to send the customized application as a response to the user terminal's page request 2-14. An example of an appropriately manipulated header will be shown in FIG. 3.

In step 2-26 the customized application, such as the loyalty card, is delivered to the user terminal. In step 2-28 it is stored in the user terminal's application memory and registered as an executable application. Steps 2-26 and 2-28 can be performed by conventional technology.

Finally, in step 2-30, the user terminal logs in with the loyalty card server (item 1-90 in FIG. 1). Provided that the loyalty card includes a concatenation of the loyalty card server's network address and the identifier of the loyalty card, the terminal user only needs to select the loyalty card from the terminal's menu, after which the customized loyalty card application contacts the loyalty card server's network address, and the loyalty card server extracts the loyalty card's information from the terminal's initial message. After that, the usage of the loyalty card may continue in a more or less conventional manner.

Figure 3:
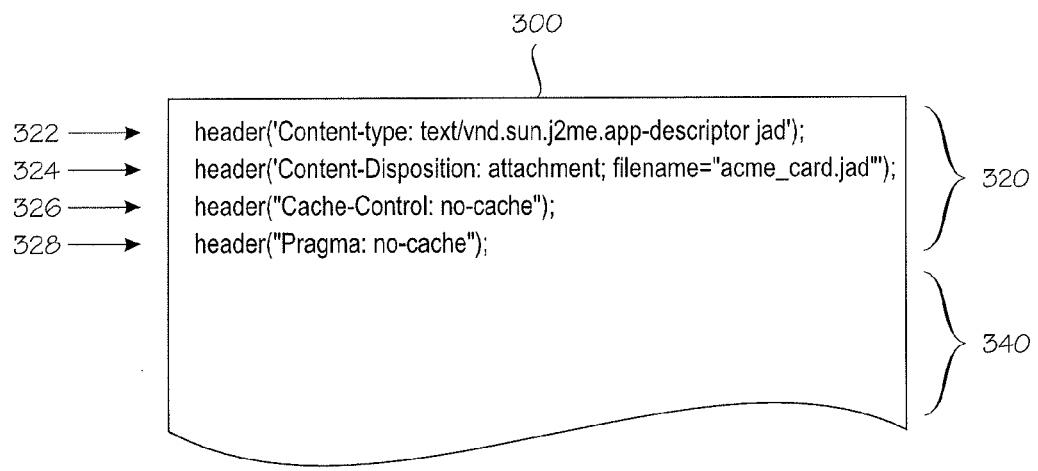
FIG. 3 shows an appropriately manipulated header, by means of which the application server is able to send the customized application as a response to the user terminal's http page request.

FIG. 3 shows an appropriately manipulated header, by means of which the application server is able to send the customized application as a response to the user terminal's http page request. Reference numeral 300 generally denotes a .jad (Java Application Descriptor) file, which comprises a header portion 320 and a body portion 340. The latter is entirely conventional and has been hidden for the sake of clarity. In the present example, the header portion 320 comprises four lines, of which the two first lines 322 and 324 relate to the header manipulation shown as step 2-24 in FIG. 2. Line 322 indicates a content type for the application descriptor, while line 324 indicates the content disposition for the actual loyalty card, which is sent as an attachment file. Optional lines 326 and 328, which relate to data security, indicate that the transmission should not be cached.

Figure 4:
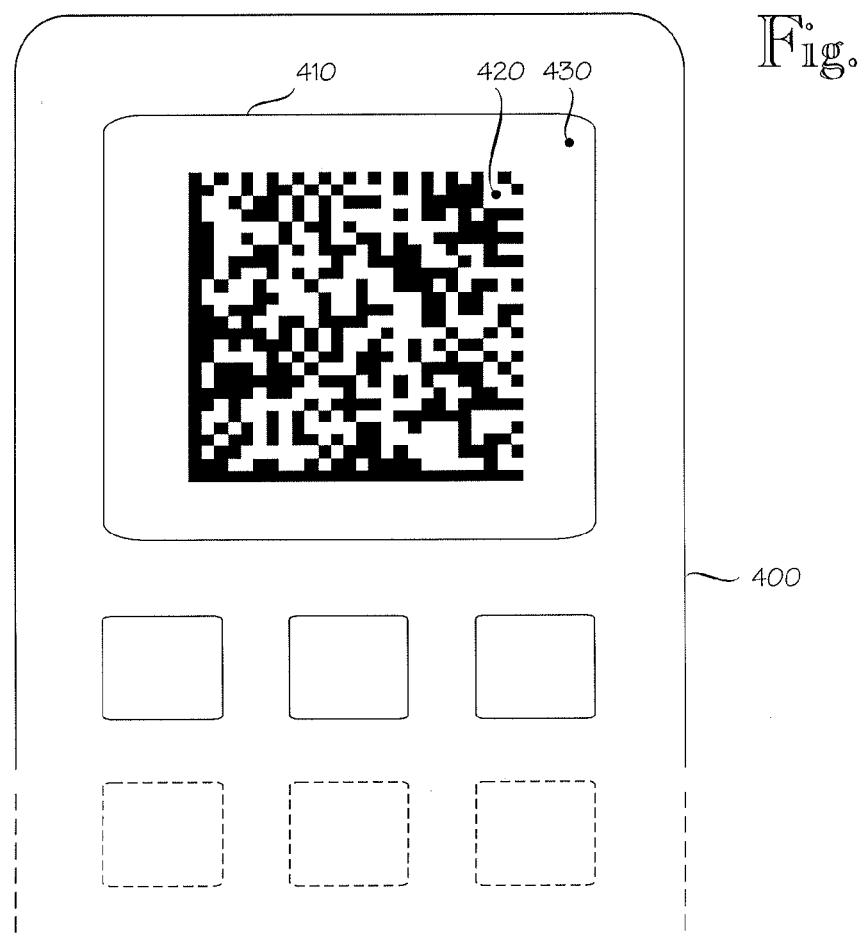
FIG. 4 shows a two-dimensional barcode optimally formatted for the display screen of a specific user terminal.

FIG. 4 shows a two-dimensional barcode 420 optimally formatted for the display screen 410 of a specific user terminal 400. The barcode 420 is centered within the display screen 410 and a white margin 430 of at least a few millimeters surrounds the barcode 420, so as to facilitate optical scanning of the barcode. Optimal formatting of the barcode may require information on the display screen in terms of both dimensions and resolution. Assume, for example, that the display screen 410 measures 40 mm and 240 pixels in either direction, which translates to 6 pixels/mm. A white margin of, say, 5 mm on either side of the bar code means 10 mm or 60 pixels in total. Thus the actual barcode 420 should span an area of 240−60=180 pixels across. The 2D barcode 430 shown in this example has 26 bits of information in either direction, which means that each bit of the 2D barcode should be drawn with a grid of 6*6 or 7*7 display pixels (180/26=6.92).

FIG. 5 shows a definition file 500 for a customized electronic loyalty card. The description language being used is a derivative of XML, and those skilled in the art are likely to find that the definition file 500 is largely self-documenting. For instance, line 501 begins the definition of the card, while line 539 ends it. Line 502 defines a file to be displayed as background graphics, while line 503 defines an image to be displayed superimposed on the background graphics, and so on. Lines 503 and 504 define identifiers for the terminal user and the loyalty card, respectively.

Line 510 begins a definition of a menu, while line 519 ends the menu definition. The selectable items of the menu are defined by the lines between the lines 510 and 519. For example, line 511 provides a definition for a menu item whose activation will provide web access to the terminal user. Line 512 defines a menu item for a positioning application. Line 517 defines a menu item for a "send to a friend" function that may or may not be implemented, depending on the specific user. Line 518 defines a barcode, as was described in connection with FIG. 4. Lines 520 through 531 define various properties and capabilities of the terminal type. For instance, lines 522 and 523 indicate that the terminal for which the card definition file 500 is customized, supports Java script and a location application, respectively. Lines 530 and 531 indicate that the terminal supports Bluetooth and network-originated IMEI locking, respectively.

As shown in FIG. 5, the definition file 500 for the customized electronic loyalty card includes user-specific features, such as the user name on line 504, card-specific features, such as the card's identification on line 505 as well as terminal-specific features, such as the property and capability definitions between lines 520 and 531. The electronic loyalty card can be customized and installed on the user terminal with almost complete automation, in response to request from the database server to the application server (see step 2-2 in FIG. 2).

FIGS. 6 and 7 illustrate embodiments relating to delivery and execution of customized web applications. In FIG. 6, reference numeral 6-20 denotes an embodiment of an application server. Still under the assumption that the customized web application is a loyalty card, the application server 6-20 of the present embodiment performs functions similar to those performed by the application server 1-20 and loyalty card server 1-90 shown in FIG. 1. In other words, the application server 6-20 of the present embodiment comprises means for creating the customized web application, such as a loyalty card, and means for supporting it during execution (use) of the customized web application. The application server 6-20 comprises HTTP servers 6-26a, 6-26b, which are examples of the communication servers 1-26 shown in FIG. 1. The application generator 6-23 generally corresponds to the application generator 1-23 shown in FIG. 1, apart from the fact that the application generator 6-23 of the present embodiment is adapted to generate customized web applications.

The embodiment shown in FIG. 6 differs from the one shown in FIG. 1 in that the request for the customized web application, such as customized source code, denoted by reference numeral 6-81 is transmitted by the user terminal 6-80. It is equally possible to use the feature described in connection with FIG. 1, wherein the request for the customized web application (application in FIG. 1) is transmitted by the loyalty card issuers, shown as item 1-10 in FIG. 1. The request for the customized web application, such as customized source code, is received by the HTTP server 6-26a and processed by the application generator 6-23. The present implementation, wherein the application generator 6-20 receives a request spontaneously requested by the user terminal 6-80 is simpler than the one shown in FIGS. 1 and 2, in the sense that the application generator 6-20 does not have to send the first data message, shown in FIG. 2 as item 2-10, in order to trigger a request from the user terminal. The application generator 6-20 needs a request from the user terminal 6-80 in order to be able to determine the type of the user terminal, because the type will be used to customize the terminal-specific properties of the customized web application.

Regardless of the manner in which the customized web application is requested (that is, spontaneously by the terminal itself, as shown in FIG. 6, or from the loyalty card issuer, as shown in FIGS. 1 and 2), the customized web application, after its generation, is conveyed to an application cache 6-27. The application cache 6-27 delivers the customized web application to the user terminal via HTTP server 6-26b, which delivery is denoted by reference numeral 6-82. The application cache 6-27 also supports execution of the customized web application during use, as denoted by reference numeral 6-83. In the present embodiment, the user terminal 6-80 comprises a cache memory 6-85 for storing a copy of the customized web application for its specified lifetime. Caching the customized web application in the cache 6-85 of the user terminal has the benefit that the cached copy can provide at least limited functionality during offline use. If the copy stored in the terminal cache 6-85 is destroyed, a fresh copy can be requested from the application cache 6-27, and if that copy is destroyed too, a fresh copy can be re-generated by the application generator 6-23.

In the embodiment shown in FIG. 6, wherein the request for the customized web application (eg, a loyalty card) is transmitted spontaneously by the user terminal 6-80, the process described in connection with FIG. 2 can be used with the following modifications. The process begins at step 2-14, which in the present embodiment is the request for the customized web application. This request identifies both the user and the terminal. Subscriber and equipment identities provided by mobile telephones can be used to identify the user and the terminal, respectively. The user identity is used to retrieve user parameters from the customer database (cf. steps 2-4 and 2-6 in FIG. 2), and the step depicted as 2-14 in FIG. 2 precedes this customer parameter query. Otherwise the process is largely similar to that described in connection with FIG. 2.

Unlike regular (non-customized) web applications, the server supporting execution of the customized web application, shown as items 6-20 and 6-27, must store a copy of each individual customized web application, or be prepared to regenerate and re-transmit it instantly as needed. This feature is clarified in FIG. 7, in which the application server, shown as item 7-20, contains an application cache 7-27, which stores a specific copy of a customized web application for each of multiple user terminals 7-80l through 7-80n.

FIG. 7 shows an implementation wherein the customized web applications are not stored in the respective user terminals, but the caching described in connection with FIG. 6 can be implemented in the present embodiment as well.

Each of the specific copies of the customized web applications may be tied to its respective user terminals 7-801 through 7-80*n*. For instance, a multi-byte checksum, such as a hash code or equivalent, can be computed from parameters specific to each individual terminal. A subscriber identity or equipment identity are illustrative but non-restrictive examples of suitable terminal-specific parameters. Alternatively or additionally, techniques such as generic URL ID compression or generic URL ID encoding can be used.

Figure 8:
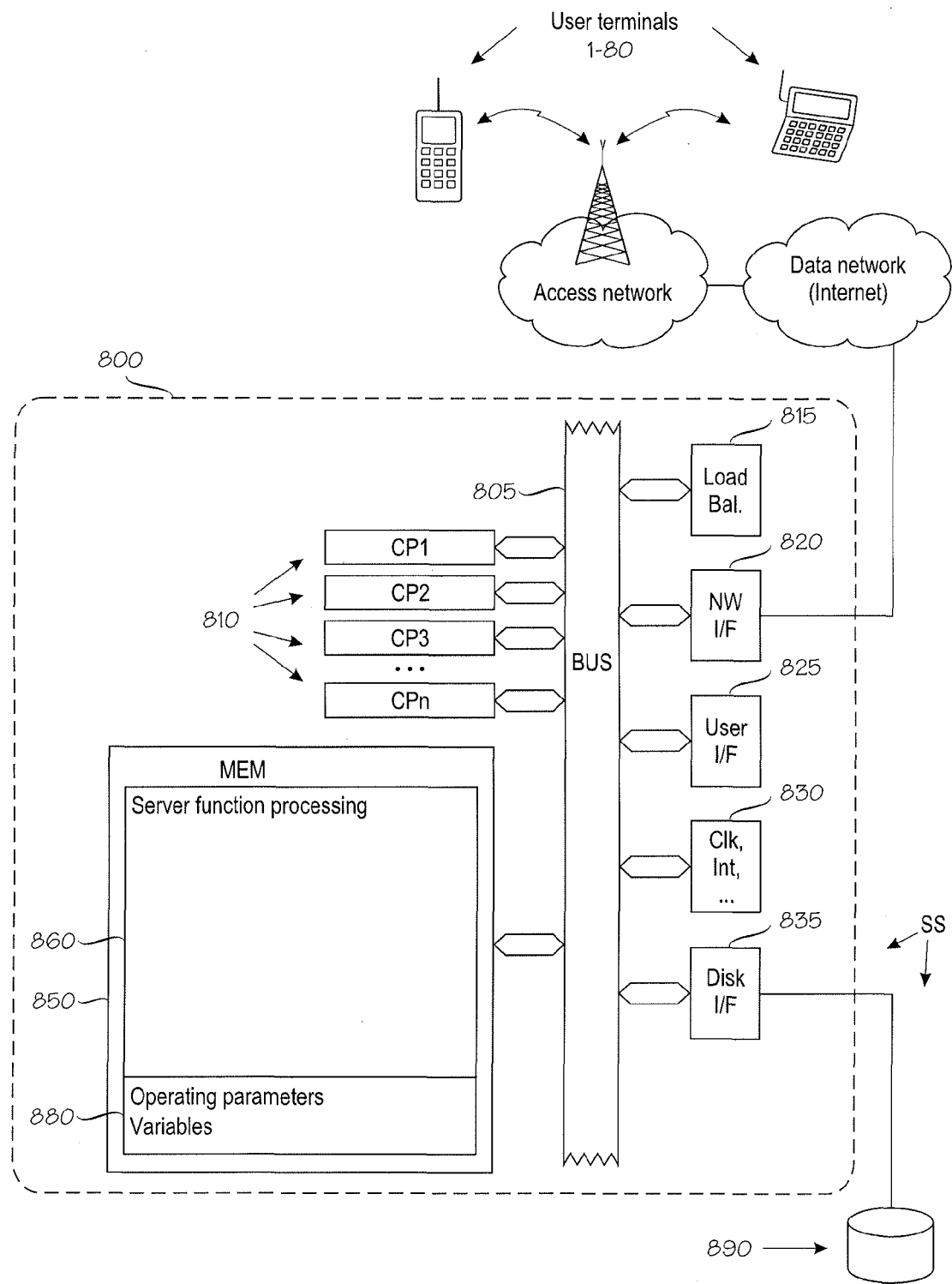
FIG. 8 schematically shows a block diagram of a server system configured to act as one or more of the various servers shown in FIG. 1.

FIG. 8 schematically shows a block diagram of a server system SS which is configured to act as one or more of the various servers shown in FIG. 1. The two major functional blocks of the server system SS are a database server computer 800 and a disk system 890. The server computer 800 comprises one or more central processing units CP1 ... CPn, generally denoted by reference numeral 810. Disclosed embodiments comprising multiple processing units 810 may be provided with a load balancing unit 815 that balances processing load among the multiple processing units 810. The multiple processing units 810 may be implemented as separate processor components or as physical processor cores or virtual processors within a single component case. The server computer 800 further comprises a network interface 820 for communicating with various data networks, which are generally denoted by reference sign DN. The data networks DN may include local-area networks, such as an Ethernet network, and/or wide-area networks, such as the internet. The server system SS serves one or more client terminals, generally denoted by reference sign CT, via the data networks DN.

The server computer 800 of the present embodiment also comprises a user interface 825. Depending on implementation, the user interface 825 may comprise local input-output circuitry for a local user interface, such as a keyboard, mouse and display (not shown). Alternatively or additionally, management of the server computer 800 may be implemented remotely, by utilizing the network interface 820 and a terminal similar to the client terminals CT. The nature of the user interface depends on which kind of computer is used to implement the server computer 800. If the server computer 800 is a dedicated computer, it may not need a local user interface, and the server computer 800 may be managed remotely, such as from a web browser over the internet, for example. Such remote management may be accomplished via the same network interface 820 that the server computer utilizes for traffic between itself and the client terminals.

The server computer 800 also comprises memory 850 for storing program instructions, operating parameters and variables. Reference numeral 860 denotes a program suite for the server computer 800.

The server computer 800 also comprises circuitry for various clocks, interrupts and the like, and these are generally depicted by reference numeral 830. The server computer 800 further comprises a disk interface to the disk system 890. The various elements 810 through 850 intercommunicate via a bus 805, which carries address signals, data signals and control signals, as is well known to those skilled in the art.

The inventive method may be implemented in the server system SS as follows. The program suite 860 comprises program code instructions for instructing the set of processors 810 to carry out the functionality of the various servers, such as the application server.

It is readily apparent to a person skilled in the art that, as the technology advances, the inventive concept can be implemented in various ways. The invention and its disclosed embodiments are not limited to the examples described above but may vary within the scope of the claims.

REFERENCE DOCUMENTS

1. Finnish patent application 20095696, filed 18 Jun. 2009
2. PCT application PCT/FI2010/050505, filed 16 Jun. 2010
3. U.S. patent application Ser. No. 12/817,527, filed 17 Jun. 2010

The invention claimed is:

1. A method for providing a user terminal with a customized web application, the method comprising the following acts performed by an application server comprising an equipment database for storing terminal-specific properties with respect to a plurality of different user terminals:
   storing a template for the customized web application and a feature set for each of several terminal types;
   receiving a set of requests for creation of the customized web application, wherein the customized web application is to be customized with respect to user-specific parameters and the terminal-specific properties for the user terminal;
   determining the user-specific parameters and a type of the user terminal based on the set of requests for the customized web application;
   determining the terminal-specific properties based on the determined type of the user terminal;
   creating the customized web application based on the template, the user-specific parameters and the terminal-specific properties;
   inserting the customized web application into a set of delivery files for a data communication system and transmitting the set of delivery files to the user terminal; and
   caching the customized web application and/or parameters for re-creating the customized web application at least for a specified validity period of the customized web application,
   wherein execution of the web application that is customized with respect to user-specific parameters and terminal-specific properties requires a respective copy of the web application at the user terminal and an application server.

2. The method of claim 1, further comprising caching the customized web application and/or parameters for re-creating the customized web application also in the user terminal at least for a specified validity period of the customized web application.

3. The method of claim 1, further comprising sending the user terminal a first data message which triggers a request from the user terminal, if the set of requests for the customized web application does not comprise a request received from the user terminal.

4. The method of claim 1, further comprising performing header manipulation on the set of delivery file, to create a manipulated header which comprises an application descriptor with content type and/or a content disposition for the web application, so as to be able to provide the customized web application as a response to the request from the user terminal.

5. The method of claim 1, wherein the determination of the terminal-specific properties based on the determined type of the user terminal comprises an inquiry to an equipment database.

6. The method of claim 1, wherein the creation of the customized web application based on the terminal-specific properties comprises formatting image information based on the user terminal's screen properties.

7. The method of claim 1, wherein the template for the customized web application comprises information common to several human languages, and the creation of the customized web application also comprises determination of a human language and retrieval of human-language-dependent text elements from a language database.

8. The method of claim 1, wherein the customized web application comprises a concatenation of a network address and identifying information, wherein the network address specifies an address for contacting by the user terminal and the identifying information identifies the user terminal, its user and/or the customized web application.

9. The method of claim 8, wherein the customized web application comprises said concatenation in an encrypted form.

10. The method of claim 1, further comprising performing header manipulation on the set of delivery files, to create a manipulated header which comprises a not-to-cache instruction concerning the transmitting of the set of delivery files.

11. The method of claim 1, wherein the acts performed by the application server further comprise extracting at least one packet header from the received and determining the type of the user terminal from the at least one extracted packet header.

12. The method of claim 11, wherein the determination of the type of the user terminal comprises determining a manufacturer and model of the user terminal.

13. An application server comprising:
at least one processing system, which comprises one or more processors;
wherein at least one processor is programmed to operate as an application generator for providing at least one user terminal with a customized web application,
wherein execution of the customized web application requires a respective copy of the customized web application at a user terminal and at the same application server or a different application server, and
wherein the customized web application is customized with respect to user-specific parameters and terminal-specific properties, the application server comprising:
an equipment database for storing terminal-specific properties with respect to a plurality of different user terminals;
storage means for storing a template for the customized web application and a feature set for each of several terminal types;
communication means for receiving a set of requests for creation of the customized web application;
first program code instructions for determining the user-specific parameters and a type of the user terminal based on the set of requests for the customized web application;
second program code instructions for determining the terminal-specific properties based on the determined type of the user terminal;
third program code instructions for creating the customized web application based on the template, the user-specific parameters and the terminal-specific properties;
fourth program code instructions for inserting the customized web application into a set of delivery files for a data communication system and means for transmitting the set of delivery files to the user terminal; and
fifth program code instructions for caching the customized web application and/or parameters for re-creating the customized web application at least for a specified validity period of the customized web application.

14. The application server of claim 13, further comprising a cache memory for caching the customized web application and/or parameters for re-creating the customized web application also in the user terminal at least for a specified validity period of the customized web application.

15. The application server of claim 13, further comprising program code instructions for sending the user terminal a first data message which triggers a request from the user terminal, if the set of requests for the customized web application does not comprise a request received from the user terminal.

16. The application server of claim 13, further comprising program code instructions for performing header manipulation on the set of delivery files, to create a manipulated header which comprises an application descriptor with content type and/or a content disposition for the web application, so as to be able to provide the customized web application as a response to the request from the user terminal.

17. The application server of claim 13, wherein the determination of the terminal-specific properties based on the determined type of the user terminal comprises an inquiry to the equipment database.

18. The application server of claim 13, wherein the creation of the customized web application based on the terminal-specific properties comprises formatting image information based on the user terminal's screen properties.

19. The application server of claim 13, wherein the template for the customized web application comprises information common to several human languages, and the creation of the customized web application also comprises determination of a human language and retrieval of human-language-dependent text elements from a language database.

20. The application server of claim 13, wherein the customized web application comprises a concatenation of a network address and identifying information, wherein the network address specifies an address for contacting by the user terminal and the identifying information identifies the user terminal, its user and/or the customized web application.

21. The application server of claim 20, wherein the customized web application comprises said concatenation in an encrypted form.

22. The application server of claim 13, further comprising a resource allocator and a work queue for distributing processing resources among several application requests from other one or more network entities communicating with the application server.

23. The application server of claim 13, further comprising program code instructions for performing header manipulation on the set of delivery files, to create a manipulated header which comprises a not-to-cache instruction concerning the transmitting of the set of delivery files.

24. A software product comprising:
a tangible and non-transitory program carrier;
wherein the tangible and non-transitory program carrier comprises program code instructions for a computer system, wherein execution of the program code instructions in the computer system causes the computer system to carry out a method for providing a user terminal with a customized web application, the method comprising:

storing a template for the customized web application and a feature set for each of several terminal types at an application server;

receiving a set of requests for creation of the customized web application at the application server, wherein the customized web application is to be customized with respect to user-specific parameters and terminal-specific properties for the user terminal;

determining the user-specific parameters and a type of the user terminal based on the set of requests for the customized web application received at the application server;

determining, at the application server, the terminal-specific properties based on the determined type of the user terminal;

creating, at the application server the customized web application based on the template, the user-specific parameters and the terminal-specific properties;

inserting the customized web application into a set of delivery files for a data communication system and transmitting the set of delivery files from the application server to the user terminal; and caching the customized web application and/or parameters, at the application server, for re-creating the customized web application at least for a specified validity period of the customized web application, wherein execution of the web application that is customized with respect to user-specific parameters and terminal-specific properties requires a respective copy of the web application at the user terminal and at the application server.

* * * * *